United States Patent Office 3,532,325
Patented Oct. 6, 1970

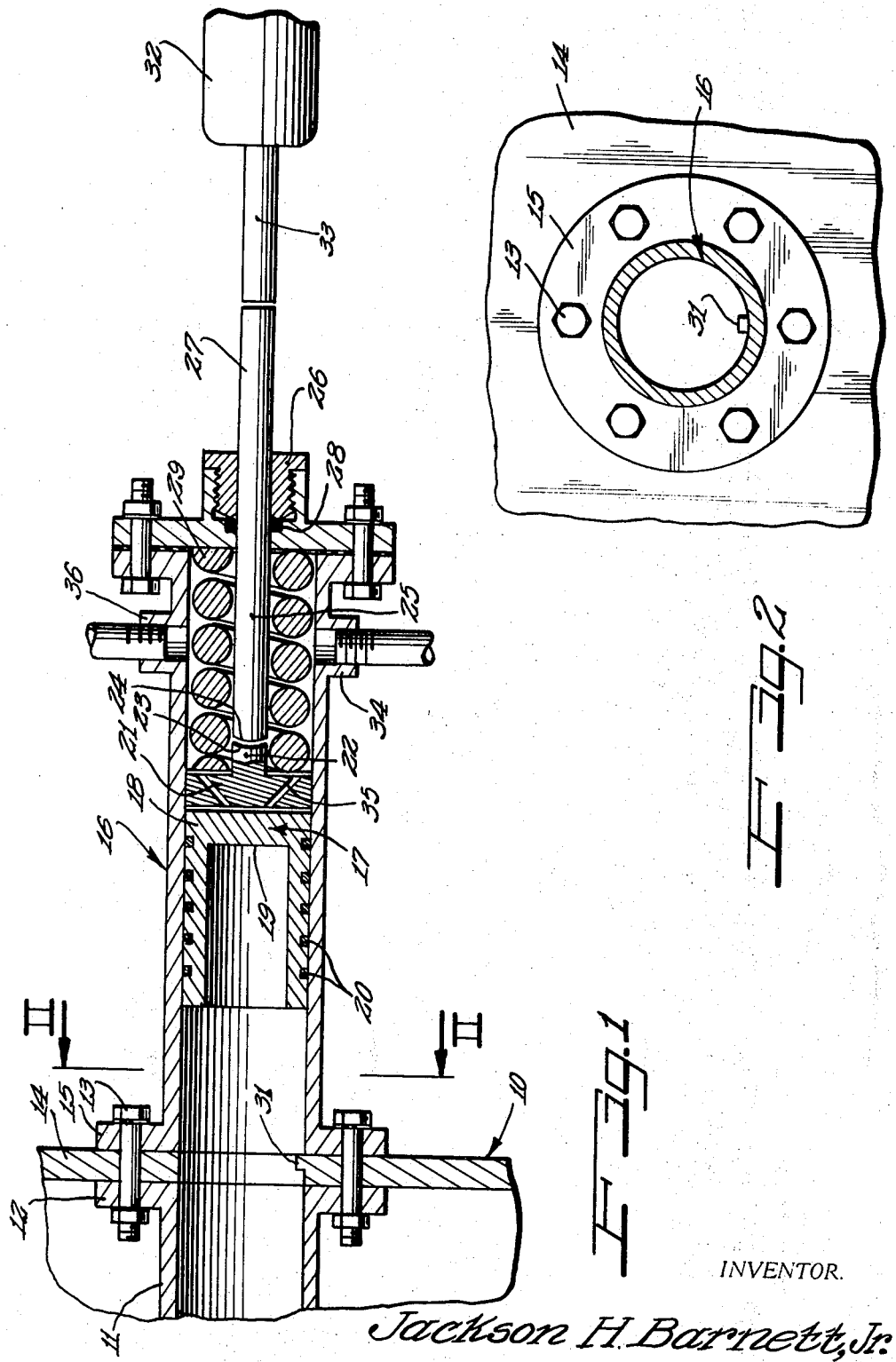

3,532,325
METHOD AND APPARATUS FOR GENERATING
SHOCK WAVES
Jackson Herman Barnett, Jr., 84 N. Crest Road,
Chattanooga, Tenn. 37404
Filed July 23, 1968, Ser. No. 746,807
Int. Cl. B01f 11/02
U.S. Cl. 259—1
10 Claims

ABSTRACT OF THE DISCLOSURE

Method and apparatus for generating trains of steep-faced shock waves for aiding in the impregnation of wood and other purposes, utilizing a free piston which in its equilibrium position is disposed within a cylinder subject on one side to the force of the pressure in the vessel and on the other side to a biasing means and striker means which periodically impact the head of the piston to transmit shock waves to the pressure vessel at a high level of mechanical efficiency.

BACKGROUND OF THE INVENTION

Wooden poles and timbers are conventionally impregnated by immersing them in a preservative solution in a pressure vessel for extended periods of time. The treatment with the impregnating solution is usually preceded by a steam treatment or by other means of conditioning. This type of process is time consuming and because of the natural variability of wood does not always result in sufficient penetration being achieved. In standard treatment procedures, the preservative starts into the wood pores and immediately aspirates the pit membranes, preventing at least to some extent the advance of the impregnating fluid. The thick centers of the pit membranes close against the pit border and act as check valves. The preservative advances only through imperfections in these check valves, and by a wicking action which results from the spreading tendency of the preservative and the free surface energy of the complex wood structures. Entrapped air is compressed ahead of the advancing liquid preservative, and this gradually reduces the effective pressure differential in the wood until for all practical purposes, an equilibrium is reached. Oil insoluble gums on the surfaces of the cell lumens and or other significant parts of the wood structure act as a barrier to micro-absorption of oil type preservative into the cellulose microfibrils in the wood structure. The wood structure at equilibrium may be pictured as containing a massive rigid foam, non-uniform in shape, but unyielding in its ability to block the penetration of the preservative. This may account, in part, for the irregular shaped untreated areas in poles and cross ties frequently found along the cross-section of wood treated according to present day practices.

SUMMARY OF THE INVENTION

The present invention provides a system for producing a train of steep front shock waves particularly designed for facilitating the impregnation of wood with preservatives, but also finds use in diverse other fields. For example, the improved shock wave generator of the present invention can be used in the treatment of crude petroleum oil wells that have been pumped to a point of uneconomical production of crude oil to release additional amounts of crude oil by flooding the strata with water.

The system of the present invention, as applied for use in conjunction with a pressure vesel makes use of a free piston capable of reciprocable movement in an open-ended cylinder one end of which is in fluid communication with the interior of the pressure vessel. The piston is maintained in its equilibrium position within the cylinder by utilizing an energy storing means in the cylinder operating against the head of the piston in opposition to the force being applied to the piston by liquid in the pressure vessel. When the piston is thus at equilibrium, a striker mechanism impacts the piston causing it to produce shock waves which travel through the fluid and into the pressure vessel. Means are provided within the apparatus to discharge any liquid which flows past the piston and might otherwise provide a dampening effect on the piston. Similarly, a gas venting means is provided in the apparatus behind the piston to prevent the accumulation of a cushion of air which might provide a similar dampening effect.

BRIEF DESCRIPTION OF THE DRAWINGS

FIG. 1 is a cross-sectional view of a free piston type assembly as it is applied to the treatment of wood for impregnation in a pressure vessel; and FIG. 2 is a cross-sectional view taken substantially along the line II—II of FIG. 1.

DESCRIPTION OF THE PREFERRED EMBODIMENTS

The assembly of FIG. 1 illustrates a pressure vessel 10 which is typically maintained at a superatmospheric pressure of 7 to 14 atmospheres. Secured in the wall of the pressure vessel 10 is a nozzle 11 having a flanged portion 12 secured to the shock wave generator by means of bolts 13. The bolts also secure a piston retaining flange 14 against which there is secured a peripheral flange 15 of a cylinder assembly generally indicated at reference numeral 16 in the drawings.

Disposed within the cylinder 16 is a free piston 17 having a head portion 18 and an internal cavity 19 which is in fluid communication with the interior of the pressure vessel 10 by virtue of the nozzle 11. The piston 17 carries a plurality of piston rings 20 to provide some measure of sealing engagement between the periphery of the piston 17 and the internal walls of the cylinder 16.

The piston head 18 is subject to impact by a striker 21 which is also reciprocable in the cylinder 16. The striker 21 has a reduced diameter stem 22 provided with a concave face 23 which is arranged to mate with the convex face 24 of a striker rod 25. From experimental results, it has been determined that the radius of curvature of the convex face 24 should be approximately two-thirds of the diameter of the transducer cylinder 16 to allow slight bending moments between the striker 21 and the striker rod 25 to be relieved but still provide proper axial alignment between the striker rod 25 and the axis of the cylinder 16. A packing gland 26 is secured to the closed end of the cylinder and an end portion 27 of the striker rod 25 extends therebeyond. An O-type sealing ring 28 is provided between the packing gland and the end of the cylinder.

A coil spring 29 is provided behind the striker 21 and urges the piston 17 against the force acting on the piston from the pressure vessel. The bias provided by the spring 29 is sufficient under equilibrium conditions substantially to center the piston 17 within the cylinder 16.

In the treatment of wood, it is frequently desirable to apply vacuum conditions in the pressure vessel 10. To prevent the piston 17 from being drawn out of the cylinder 16 under vacuum conditions, the piston retaining flange 14 is provided with a lug 31 which serves as a stop to the movement of the piston. Preferably, the lug is provided with a streamlined shape to provide a minimum of hydrodynamic drag to the advancing liquid in the shock wave generated by impacting of the piston.

Any suitable cyclic hammer means can be employed to impact the striker rod 25 and thereby set up the train of steep front shock waves through the liquid. In the form of the invention illustrated in the drawings, the hammer takes the form of an air hammer 32 having an impacter 33 which delivers periodic blows to the end 27 of the striker rod 25. The frequency of the blows will, of course, depend upon the particular installation in them and it may range from as low as one cycle per minute to as high as 750 cycles per second in most cases.

The cylinder 16 is also provided with a fitting 34 which serves as a drain for any liquid "blow by" escaping past the piston. The striker 21 is provided with angularly extending passages 35 to vent any such liquid. If the liquid were permitted to accumulate, it would tend to damp the shock wave reaction and prevent optimum conversion of energy from the power hammer to the piston 17. Similarly, a vent nozzle 36 is also provided in the chamber to vent air from the chamber behind the piston which might otherwise provide a dampening effect on the movement.

When the contents of the pressure vessel is subjected to repetitive steep front shock waves produced by the impacting in the piston 17, the preservative under pressure at first aspirates the pit membranes. When the first shock wave advances through the liquid, it may not be able to unblock a bordered pit, but the shock wave sets up a compression wave in the wood structure that travels at a slower speed than does the hydraulic shock wave. As the sharp peak of the hydraulic shock wave is dissipated, the compression wave in the wood forces air inside the cell to press against the aspirated pit membrane, causing it to open, and allowing the escape of micro-bubbles of air. When the next shock wave arrives it slams the pit membrane shut. Repeated many times, the thick centers of the pit membranes appear to be conditioned to allow preservative to pass on to the next cell. The conditioning does not appear to reduce the strength of the wood.

The repetitive shock waves also cause the preservative to "scrub" the insides of the cells of the wood, mixing or momentarily emulsifying the liquid into the surface and onto the cellulose microfibrils. Consequently, they are more adequately treated. The "scrubbing" effect of the shock waves appears to push moisture ahead of oil-type preservatives, if there is any free moisture above the cell moisture equivalent in the wood. Eventually, on standing, the moisture dissipates outwardly and the preservative is then able to migrate inwardly more completely.

The apparatus described is an automatically cyclic device for generating sharp faced shock waves that are repetitive and capable of resonance when the device is properly tuned. The amount of power required is related to the volume of the pressure vessel, the viscosity of the fluid in the pressure vessel, the nature of the cellular material, and possibly other factors. Generally, the power of the hammer should be capable of developing a transducer volume displacement of about 5 to $15 \times 10^{-6}$ cubic inch per cubic inch of volume in the pressure vessel per cycle.

As has been noted previously, in the quiescent or equilibrium position, the forces acting on the free piston 17 are in equilibrium, so that the power hammer has substantially no resistance from the liquid under pressure in the pressure vessel. Virtually all of the energy in the power hammer blow is thus converted into sharp faced, hydrodynamic shock wave energy.

From the foregoing, it will be understood that the method and apparatus of the present invention provides a more efficient generator of steep fronted hydrodynamic shock waves which can significantly reduce the time involved in impregnating wood with preservative solutions, or for other purposes.

It will also be understood that various modifications can be made to the described embodiments without departing from the scope of the present invention.

I claim as my invention:

1. A transducer apparatus for generating and transmitting a train of steep faced shock waves into a confined liquid under pressure which comprises an open-ended cylinder, means for mounting said cylinder in fluid communication with the confined liquid, a free piston reciprocable in said cylinder, striker means arranged to receive periodic impacts and thereby move said piston against the force operating on said piston from said confined liquid, and energy storing means in said cylinder urging said piston into an equilibrium position in said cylinder.

2. The apparatus of claim 1 in which said energy storing means comprises a coil spring acting against the head of said piston.

3. The apparatus of claim 1 in which said striker means includes passages therein for passing fluid escaping past said piston, and drain means in said cylinder for discharging said fluid from said cylinder.

4. The apparatus of claim 1 in which said cylinder includes means for venting gases therefrom.

5. The apparatus of claim 1 in which said means for mounting includes a stop for limiting the extent of movement of said piston toward said confined liquid.

6. The apparatus of claim 1 in which said striker means includes a striker engaging the head of said piston and a striker rod positioned coaxially with said striker.

7. A transducer apparatus for generating and transmitting a train of steep faced shock waves into a pressure vessel which comprises an open ended cylinder, means for securing said cylinder to a pressure vessel in fluid communication with the interior of said vessel, a free piston arranged to reciprocate within said cylinder, a striker acting on the head of said piston, a spring biasing said striker to urge said piston against the force on said piston from said pressure vessel, means in said apparatus for discharging liquid therefrom, means in said apparatus for venting gases therefrom, and a striker rod arranged to engage said striker, said rod having a portion extending outside said apparatus for impacting by a hammer.

8. The method of generating steep faced shock waves in a confined liquid under pressure which comprises connecting a cylinder into fluid communication with said liquid, applying the force in said liquid to one end of a piston reciprocable in said cylinder, applying a biasing force to said piston at the other end thereof to thereby position said piston in an equilibrium position within said cylinder, and periodically impacting said other end of said piston to thereby generate a train of shock waves.

9. The method of claim 8 in in which said piston is impacted at a rate of from 1 cycle per minute to 750 cycles per second.

10. The method of claim 8 which includes the step of venting liquid and gases from behind said other end of said piston.

References Cited

UNITED STATES PATENTS

| | | | |
|---|---|---|---|
| 2,784,150 | 3/1957 | Rose | 259—112 X |
| 3,151,958 | 10/1964 | Bodine | 259—1 |
| 3,251,576 | 5/1966 | Horsley | 259—4 |
| 3,368,610 | 2/1968 | Kartluke | 259—1 X |

ROBERT W. JENKINS, Primary Examiner

U.S. Cl. X.R.

259—113